US008756518B2

(12) United States Patent
Nagarajan et al.

(10) Patent No.: US 8,756,518 B2
(45) Date of Patent: Jun. 17, 2014

(54) STACK OBJECTS ORDER TRAVERSAL AND MANIPULATION

(75) Inventors: Rathnagiri Nagarajan, Bangalore (IN); Yadvinder Bhatia, Punjab (IN)

(73) Assignee: Adobe Systems Incorporated, San Jose, CA (US)

( * ) Notice: Subject to any disclaimer, the term of this patent is extended or adjusted under 35 U.S.C. 154(b) by 1036 days.

(21) Appl. No.: 12/011,282

(22) Filed: Jan. 24, 2008

(65) Prior Publication Data
US 2013/0114913 A1    May 9, 2013

(51) Int. Cl.
*G06F 3/048* (2013.01)

(52) U.S. Cl.
USPC ............................ 715/766; 715/794; 715/797

(58) Field of Classification Search
USPC ............................ 358/1.18; 715/243; 345/641
See application file for complete search history.

(56) References Cited

U.S. PATENT DOCUMENTS

| | | | |
|---|---|---|---|
| 5,041,992 A | | 8/1991 | Cunningham et al. |
| 5,377,314 A | | 12/1994 | Bates et al. |
| 5,490,246 A | * | 2/1996 | Brotsky et al. ................ 715/763 |
| 5,651,107 A | | 7/1997 | Frank et al. |
| 5,689,717 A | | 11/1997 | Pritt |
| 5,754,177 A | * | 5/1998 | Hama et al. ................... 715/862 |
| 6,606,105 B1 | * | 8/2003 | Quartetti ....................... 715/853 |
| 7,523,405 B2 | * | 4/2009 | Robertson et al. ........... 715/766 |
| 2005/0094206 A1 | * | 5/2005 | Tonisson ..................... 358/1.18 |
| 2007/0050729 A1 | | 3/2007 | Kawamura et al. |
| 2007/0074159 A1 | | 3/2007 | Ueno |
| 2007/0081718 A1 | | 4/2007 | Rubbert et al. |
| 2007/0280407 A1 | | 12/2007 | Kunze et al. |

OTHER PUBLICATIONS

Adobe Creative Team, Adobe Illustrator CS2 Classroom in a Book, Jun. 17, 2005, Adobe Press, pp. 78-113, 208-231, 379.*
Bouton, Gary et al. Inside Photoshop CS, May 26, 2004, Sams, pp. 582-586.*
Tapp, Eddie, Photoshop Workflow Setups, Aug. 1, 2006, O'Reilly Media, Inc., pp. 1-5, 25.*
Lee, Janet. Adobe Photoshop CS2 Step by Step Instructions—Using Layers, Dec. 2006, Loyla Marymount University, http://its.lmu.edu/Assets/Administration+Division/Human+Resources/Computer+Workshops/Learning+Tools/Learning+Tools+Photoshop+Using+Layers.pdf.*
Adobe Systems Incorporated. "Isolate groups and sublayers." [Online]<http://livedocs.adobe.com/en_US/Illustrator/13.0/help.html?content=WS8BBBC4A7-EACB-4cc1-AE68-4848465E416F.html>.

* cited by examiner

*Primary Examiner* — Matt Kim
*Assistant Examiner* — William Trapanese
(74) *Attorney, Agent, or Firm* — Finch & Maloney PLLC (57) ABSTRACT

Techniques for stack object order traversal and manipulation are described, including presenting an object preview panel having objects, each of the objects being associated with at least one stack object presented in a document panel, and performing an operation associated with at least one of the stack objects, the operation including accessing a stack object data file and a document file, where the operation is initiated in the object preview panel and performed in the document panel.

26 Claims, 10 Drawing Sheets

STACK OBJECTS ORDER TRAVERSAL AND MANIPULATION

FIELD OF THE INVENTION

The present invention relates generally to computer hardware and software architecture. More specifically, techniques for stack object order traversal and manipulation are described.

BACKGROUND

Working with documents (i.e., any type of file or data structure that includes other data) typically involves working with various types of objects (e.g., data that, when rendered, generates graphics, images, photos, text, multimedia, or other content or information) embedded or otherwise included within documents. Different types of documents and objects often involve managing overlapping objects (i.e., the objects are stacked or are configured so as to overlap partially, substantially, or entirely) using authoring, editing, or other types of applications. However, conventional solutions are problematic.

Some conventional solutions used for object design, editing, or authoring are problematic in that users must individually isolate or deconstruct a stack or group of objects in order to select and edit a particular object. Users must move or re-arrange overlapping objects in order to isolate an object in order to select the object and modify any associated attributes. Experienced users often use a combination of keyboard hot keys and mouse events (i.e., "clicks") to traverse the hierarchy of a stack of objects. However, this requires a significant amount of user experience and expertise. Thus, conventional solutions to isolate and modify attributes of objects are time and labor-intensive when working with content such as overlapping objects. Further, when additions, deletions, or other modifications are made to objects or documents, conventional solutions do not provide the ability to preview these modifications. In other words, conventional solutions are also problematic due to a lack of ability to preview changes before being made to a document or object. If a user is editing objects within a document, the user must first make the changes before deciding whether they are desirable (i.e., to keep them). If the changes are not desirable, a user must undo the changes, resulting in lost and unnecessary time and effort. In other words, conventional solutions do not allow users to preview changes in a time and labor-efficient manner.

Thus, a solution for performing operations on objects in documents without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, AIR™, FleX™, Java™, Javascript™, Ajax, COBOL, Fortran, ADA, XML, HTML, DHTML, XHTML, HTTP, XMPP, and others. Design, publishing, and other types of applications such as Illustrator®, Photoshop®, Dreamweaver®, Shockwave®, Fireworks®, InDesign®, and others may also be used to implement the described techniques. The described techniques may be varied and are not limited to the examples or descriptions provided.

Techniques for stack object order traversal and manipulation are described. In some applications, the described techniques may be implemented to author, edit, delete, or otherwise modify partially, substantially, or entirely-overlapping objects (hereinafter referred to as "stack objects") within documents. Stack objects (e.g., shapes, text, graphics, images, photos, and others) may be manipulated using the techniques described herein and are not limited to any particular type, configuration, or attribute. In some examples, stack objects or groups of stack objects (i.e., stack objects that are grouped together or otherwise identified as a single instance of objects that may be manipulated as a single instance) within a document may be selected using various techniques (e.g., using a marquee or pointer to draw a box or other selection field around one or more stack objects). When selecting stack objects within a document window or panel ("document panel"), a menu or other user prompt may be presented that enables the invocation of a object preview window or object preview panel (hereafter referred to as "preview panel"), in which the stack objects selected are shown apart from their "in-document" configuration (e.g., stacked). For example, if a stack of nine objects are selected using a marquee selection tool, a menu may appear from which a user may select an object preview option, which invokes an object preview panel in which the stack objects are shown individually and apart from the stacked configuration. As another example, selected stack objects within a document may be presented in a "top-down," "bottom-up," or "side-to-side" orientation, which may be varied based on configuration settings associated with an object preview panel. From the object preview panel, various actions and operations ("operations") may be performed on the objects and associated attributes (e.g., fill color, gradient, texture, brush, style, color, opacity, alignment, transformation (i.e., dimensions such as width, height, angular displacements, etc.), and others. Operations may include moving, swapping (i.e., exchanging or changing the order in a stack of two or more objects), transforming (i.e., performing a geometric transformation), or others. Once made, changes may be reflected within the object preview panel and the document panel, enabling a user to easily view changes to an object within the document panel (i.e., in its stacked configuration) and the object preview panel (i.e., in a non-stacked configuration), substantially simultaneously. In other examples, the techniques described herein may be implemented differently and are not limited to any specific example or implementation technique described.

Figure 1:
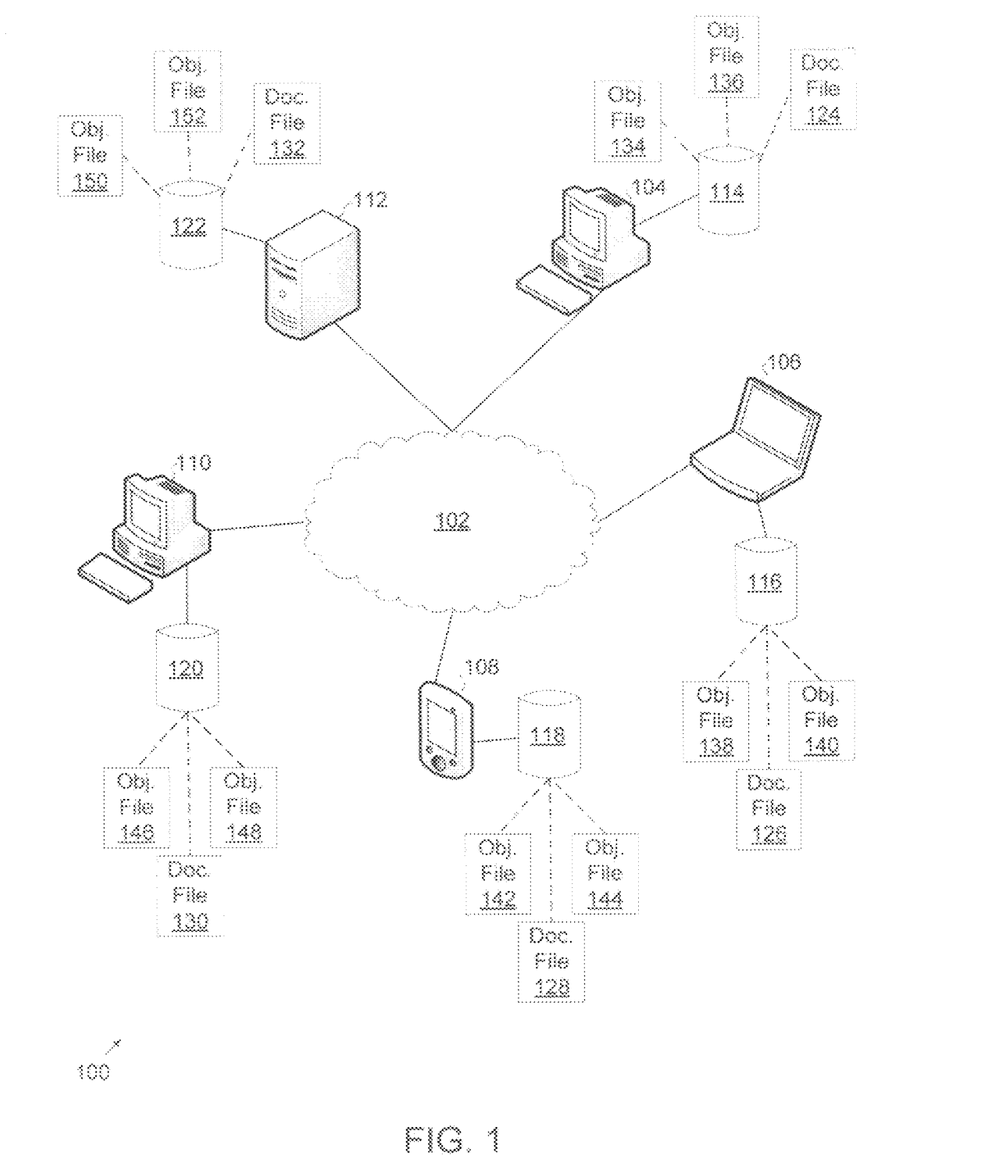
FIG. 1 illustrates an exemplary system for stack object order traversal and manipulation.

FIG. 1 illustrates an exemplary system for stack object order traversal and manipulation. Here, system 100 includes network 102, clients 104-110, server 112, each of which may house repositories 114-122, which may be implemented as a database, data mart, data warehouse, storage area network, network attached storage, or other types of memory. Stored within each of repositories 114-122 may be various types of files associated with documents and stacked objects, including document files 124-132 and object files 134-152. The numbers, types, topologies (e.g., standalone, networked, client-server, peer-to-peer, distributed (e.g., web services distributed based on protocols such as IEEE), and others), and configurations shown may be varied and are not limited to those shown, which are provided as examples and not as specific implementation techniques.

In some examples, applications using the techniques described herein for manipulating stack objects and traversing stack object order may be executed by any of clients 104-110 or server 112. For example, a desktop computer (e.g., clients 104 or 110) with an installed application may be used to perform the techniques described. As another example, server 112 may have one or more applications installed that enable the described techniques to be performed locally or by other clients (e.g., clients 104-110) over network 102, which may a private network (e.g., LAN, VPN, WAN, MAN, or other) or a public network (e.g., the Internet and others). The topologies shown may be varied and are not limited to the specific configurations shown. Further, system 100 and the above-described elements may be varied and are not limited to the examples provided.

Figure 2:
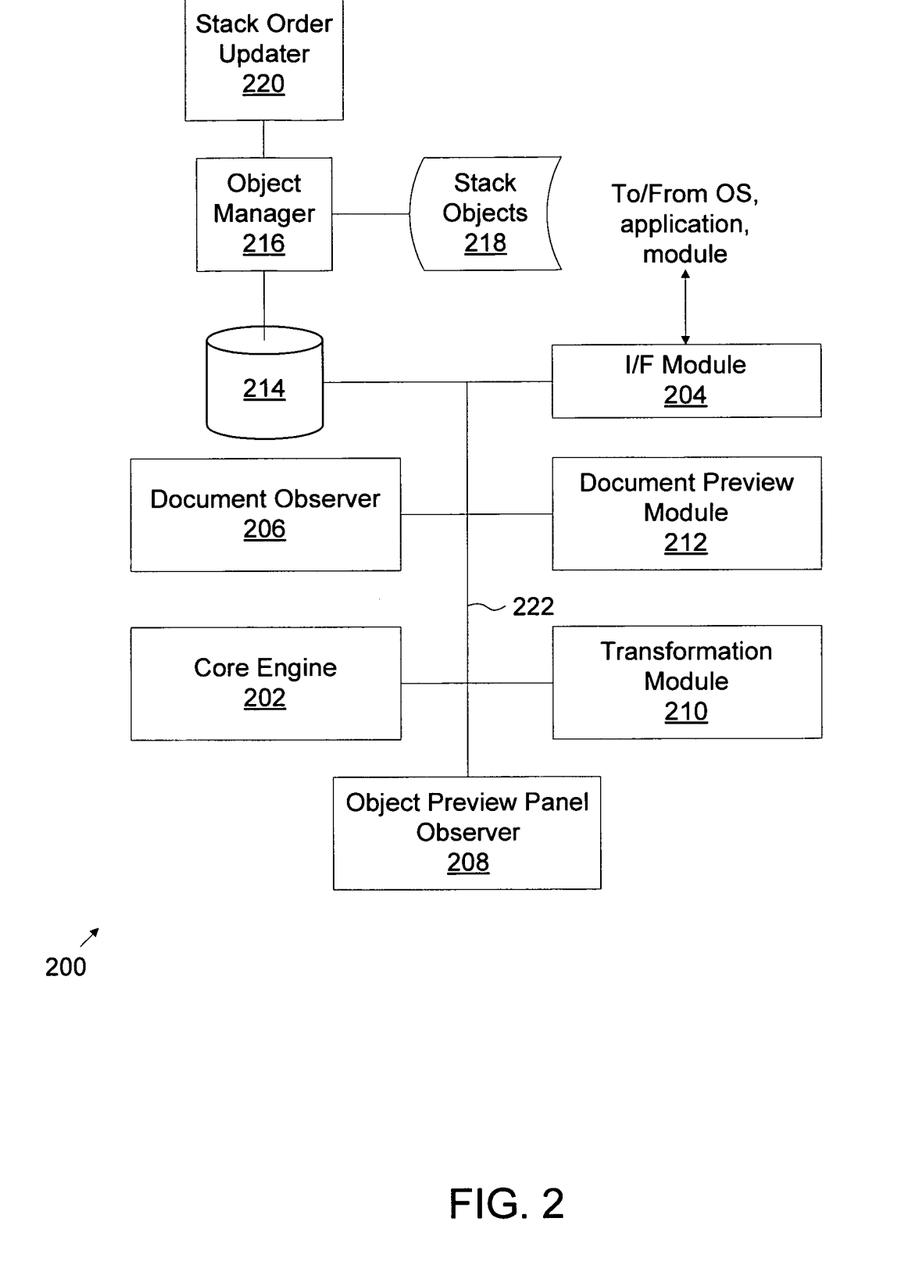
FIG. 2 illustrates an exemplary application architecture for stack object order traversal and manipulation.

FIG. 2 illustrates an exemplary application architecture for stack object order traversal and manipulation. Here, application 200 may include core engine 202, interface (I/F) module 204, document observer 206, object preview panel observer 208, transformation module 210, document preview module 212, repository 214, object manager 216, stack objects 218, and stack order updater 220. Application 200 may be implemented as shown or differently and is not limited to the types, numbers, or configurations of modules and engines shown. In some examples, application 200 may be implemented as a standalone application, as a module or component of another application, or differently. Here, core engine 202 may be implemented as logic or a set of instructions or computer program code that are configured to manage or otherwise control operations performed by the elements shown. I/F module 204 may be used to send, receive, or otherwise transfer data between application 200 and the elements shown and, for example, another application, operating system, module, engine, or other element not shown. Document observer 206 is configured to observe user and system actions taken with regard to a particular document. In some examples, document observer 206 may be used to observe a document panel that is displayed on, for example, a display screen of a monitor that allows a user to view a document. In other examples, document observer 206 may be an application that observes data operations ("operations") that are performed on a document at a different layer (e.g., data layer, application layer) other than the presentation layer of application 200 (i.e., from a data object model perspective (e.g., OSI, Internet, and others)).

In some examples, when stack objects or a set of grouped stack objects are selected, an object preview panel may be invoked, launched, and presented ("invoked") within the document panel by document preview module 212. Operations performed within an object preview panel (not shown) may be observed by object preview panel observer 208, which may be configured to communicate observed changes to objects within an object preview panel to document preview module 212. In other examples, document preview module 212 may be configured to generate and present an object preview panel on, for example, a display screen. As an example, an object preview panel may be generated, when invoked, within the display environment of a document panel. Alternatively, an object preview panel may be invoked apart from a document panel and is not limited to the implementations described herein. In other examples, transformation module 210 may be implemented by application 200 to handle geometric transformations of stack objects. Geometric transformations, in some examples, may be performed to add, delete, change, or otherwise modify attributes associated with the layout, size, shape, contour, dimensions, or other aspects of stack objects.

In some examples, objects may be housed within repository 214. Repository 214 may be used to install, store, run, execute, or house ("house") stack objects 218 and stack order updater 220. As an example, stack objects 218 may be data that is stored in files or other types of data structures. Likewise, document files or other data structures may also be stored in repository 214. Further, if an order of a group of stack objects is changed, traversed, or otherwise manipulated, stack order updater 220 may be a process that is invoked to move, swap, or otherwise change the order of stack objects in a given stack. In other examples, application 200 and the provided elements may be varied in design, process, architecture, function, implementation, or other aspects and are not limited to the techniques shown and described.

Figure 3:
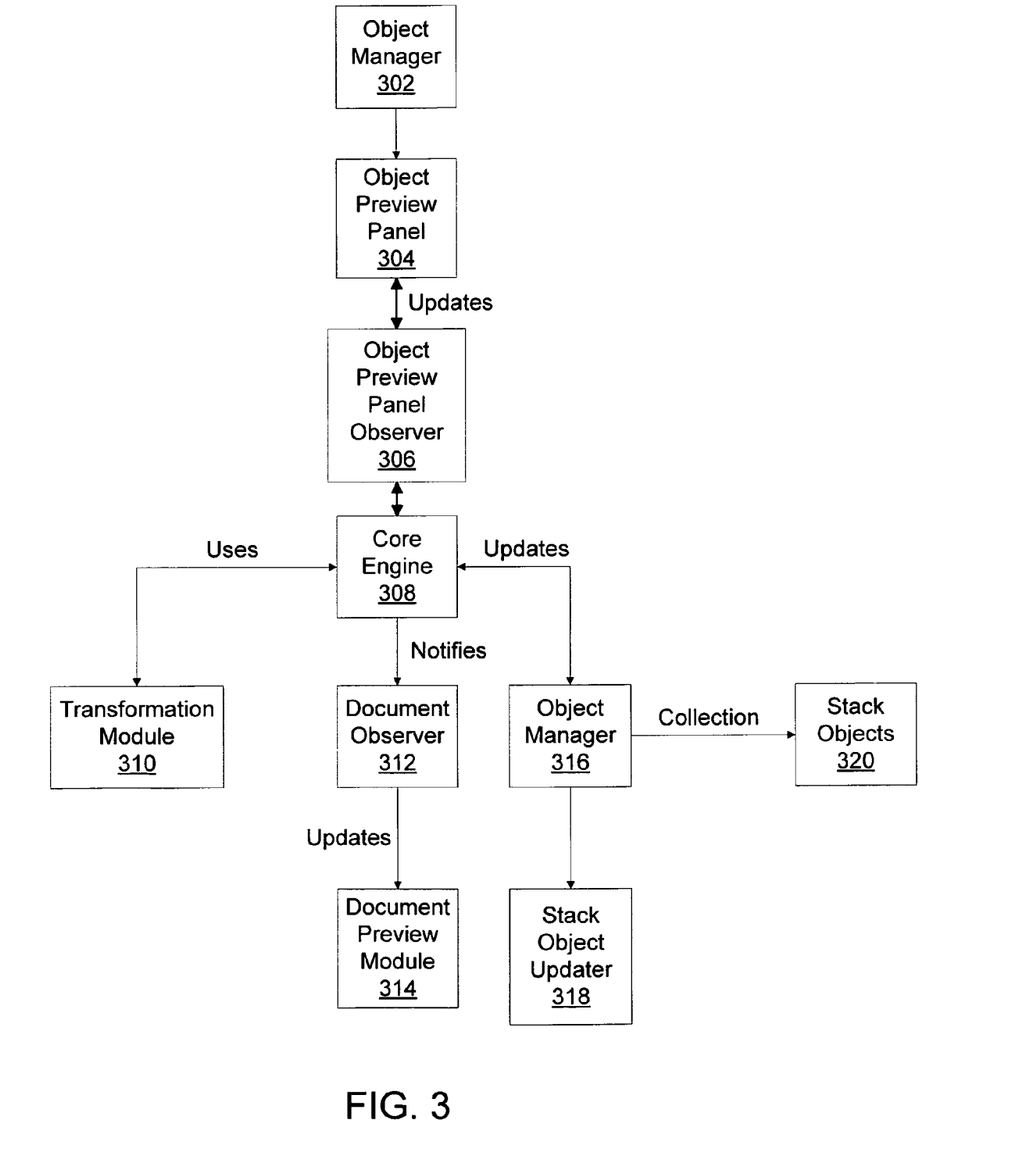
FIG. 3 illustrates an alternative exemplary application architecture for stack object order traversal and manipulation.

FIG. 3 illustrates an alternative exemplary application architecture for stack object order traversal and manipulation. Here, application 300 illustrates an alternative example of application 200 (FIG. 2) and the above-described elements. The described elements may be configured to function as processes or applications within an application architecture.

In some examples, object manager 302 sends data (e.g., stack object files, document files, data included or associated with a given stack object, or the like) to object preview panel 304. As an example, object preview panel 304 may be used to display or present ("present") objects that are selected within a document (i.e., within a document panel). In some examples, the order in which objects are displayed in object preview panel 304 may be configured by a user, who may select various orientations for presenting objects (e.g., "top-to-bottom" (i.e., objects that are layered on the top of a stack are presented first), "bottom-to-top" (i.e., objects that are on the bottom of a layer are presented first), "side-by-side" (i.e., objects are presented in a left-to-right or right-to-left orientation depending upon an object's position in a stack), or other orientations for presenting a stack of objects in object preview panel 304). When selected, object files associated with the selected objects in a given document are used to create representations of the objects within object preview panel 304. However, objects presented in object preview panel 304 are not presented in a stacked configuration, but instead are presented individually separate or apart from each other in order to view and facilitate selecting and performing operations involving a selected object, as described in greater detail below. Data may be exchanged between object preview panel 304 and object preview panel observer 306, the latter of which may exchange data with core engine 308. Depending upon the type of operation indicated for performance in association with a given object, different processes may be invoked. For example, some uses of application 200 may be transformations (i.e., geometric transformations) of an object. Thus, core engine 308 exchanges data with transformation module 310. As additions, deletions, changes, moves, swaps, transformations, or other operations are performed to objects in an object preview panel, updates may be performed to present how the operations affect stack objects in a document. In other words, objects presented in an object preview panel may be copies or representations of stack objects in a document. In some examples, when operations are performed on objects presented in an object preview panel, corresponding updates are made to corresponding stack objects in a document. Thus, core engine 308 notifies document observer 312, which observes operations being performed in a document panel. Subsequently, document observer 312, which may be implemented similarly to document observer 206 (FIG. 2), sends data regarding stack object updates to document preview module 314, which may also be implemented similarly to document preview module 212 (FIG. 2). Further, when operations are performed, updates may be sent to object manager 316, which controls or manages updates to stack object data stored as stack object files (i.e., stack objects 320), which are also updated using stack object updater 318.

In some examples, objects may be presented in an object preview panel (not shown) presented within or without a document panel (not shown). Each object may correspond to a given stack object in a document. When an operation is performed on an object, a corresponding operation, update, notification, or other modification may be made to the corresponding stack object in the document, as shown and described. In other examples, application 300 and the above-described elements may be varied and are not limited to the examples provided.

Figure 4A:
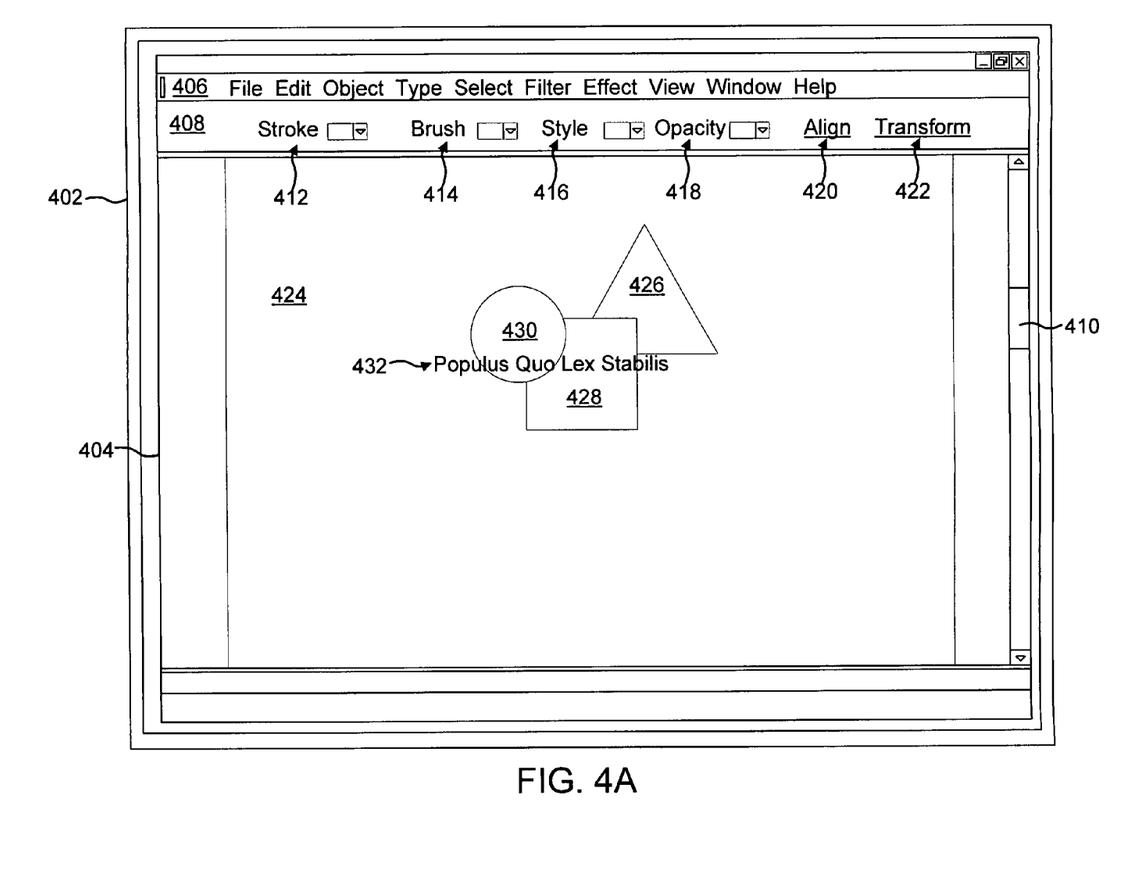
FIG. 4A illustrates an exemplary application interface for stack object order traversal and manipulation.

FIG. 4A illustrates an exemplary application interface for stack object order traversal and manipulation. Here, interface 402 is shown with document panel 404, menu panel 406, operation panel 408, scroll bar 410, operations 412-422, document 424, and stack objects 426-432. In some examples, interface 402 and document panel 404 may be illustrative of an interface for any type of application configured to provide authoring, editing, or any other type of operation on a document. Applications may include photo editing, web design, online or print page layout and editing, or any other type of audio, visual, video, text, graphics, or multimedia authoring or editing applications. As used herein, document may be used to refer to any type of file or data structure that may be edited using the types of application discussed herein.

Here, document 424 includes stack objects 426-432. The size, number, configuration, placement, and location of stack objects 426-432 may be varied and is not limited to the examples shown. In some examples, stack objects 426-432 may be a triangle (i.e., polygonal) geometric shape (i.e., stack object 426), a square (i.e., polygonal) geometric shape (i.e., stack object 428), a circular or elliptical geometric shape (i.e., stack object 430), and text (i.e., stack object 432), respectively. In other examples, different types (e.g., audio, video, visual, graphic, image, photo, documents, and others), sizes, shapes, quantities of objects may be used other than those shown (i.e., stack objects 426-432). Further, stack objects 426-432 are configured in a partially-overlapping configuration. In still other examples, stack objects 426-432 may be configured in an entirely or near-entirely overlapping configuration.

In some examples, stack objects 426-432 may be configured in a "stack" if the stack objects are partially, substantially, or entirely overlapping. Here, the order of stack objects 426-432 may be assigned using a bottom-to-top ordering schema or system. In other examples, a stack order (hereafter referred to as "order") may be determined using a top-to-bottom or different type of schema or system other than those shown and described. As an example, stack object 426 has an order of "1." Likewise, stack objects 428-432 have stack orders "2" through "4," respectively. In still other examples, interface 402 and the above-described elements may be varied in layout, design, function, appearance, or other aspects and are not limited to those shown and described.

Figure 4B:
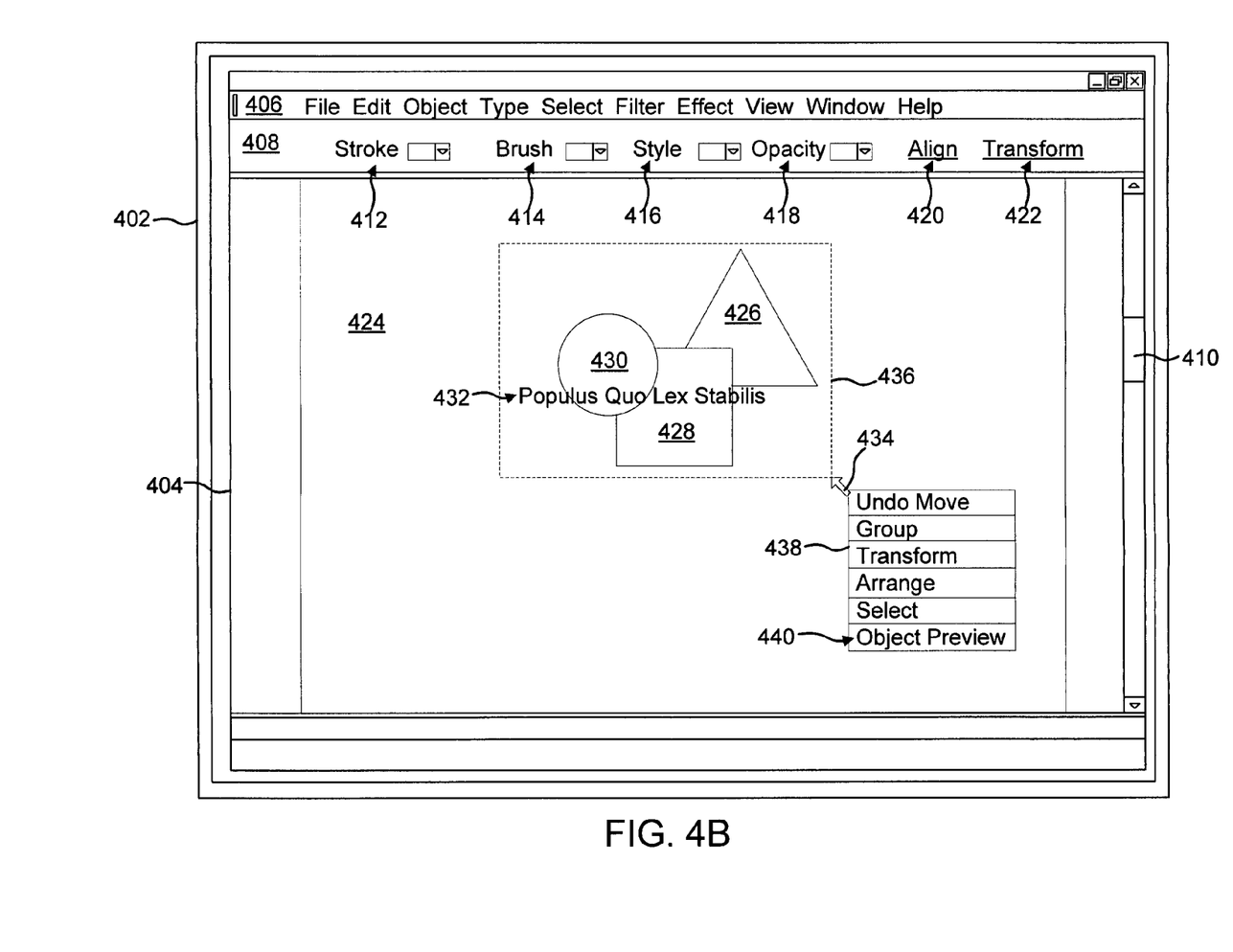
FIG. 4B illustrates another exemplary application interface for stack object order traversal and manipulation.

FIG. 4B illustrates another exemplary application interface for stack object order traversal and manipulation. Here, interface 402 is shown with document panel 404, menu panel 406, operation panel 408, scroll bar 410, operations 412-422, document 424, stack objects 426-432, pointer 434, selection box 436, menu 438, and menu option 440. In some examples, a selection technique (e.g., marquee, "click-and-drag," "point-and-click," and others) may be used to create selection box 436 around stack objects 426-432. For example, by pointer 434 may be used, when holding down a "left click" button on a mouse (i.e., a user input device), to draw selection box 436 around stack objects 426-432. Holding a "left click" button down, a user may drag pointer 434 from, for example, an upper left corner to a lower right corner of selection box 436, which may be configured to appear when the "left click" button is released. Once released, objects enclosed within the marquee selection are highlighted or selected for group processing and menu 438 may be configured to appear when a "right click" button on a mouse is pressed. In other examples, different types of user input devices apart from a mouse may be used to create the described techniques. Further, stack objects 426-432 may be selected as a group, as shown, or individually. Various types of techniques may be used to select one or more of stack objects 426-432 and are not limited by those shown and described.

As shown, various types of menu options may be presented in menu 438. Here, menu option 440 may be presented to allow a user to invoke an object preview panel. Any type of option may be presented and is not limited to the examples (e.g., "Object Preview") shown and described. In other examples, different types of techniques may be used other than menu 438 or menu option 440 to invoke an object preview panel, as shown and described. In still other examples, interface 402 and the above-described elements may be varied in layout, design, function, appearance, or other aspects and are not limited to those shown and described.

Figure 4C:
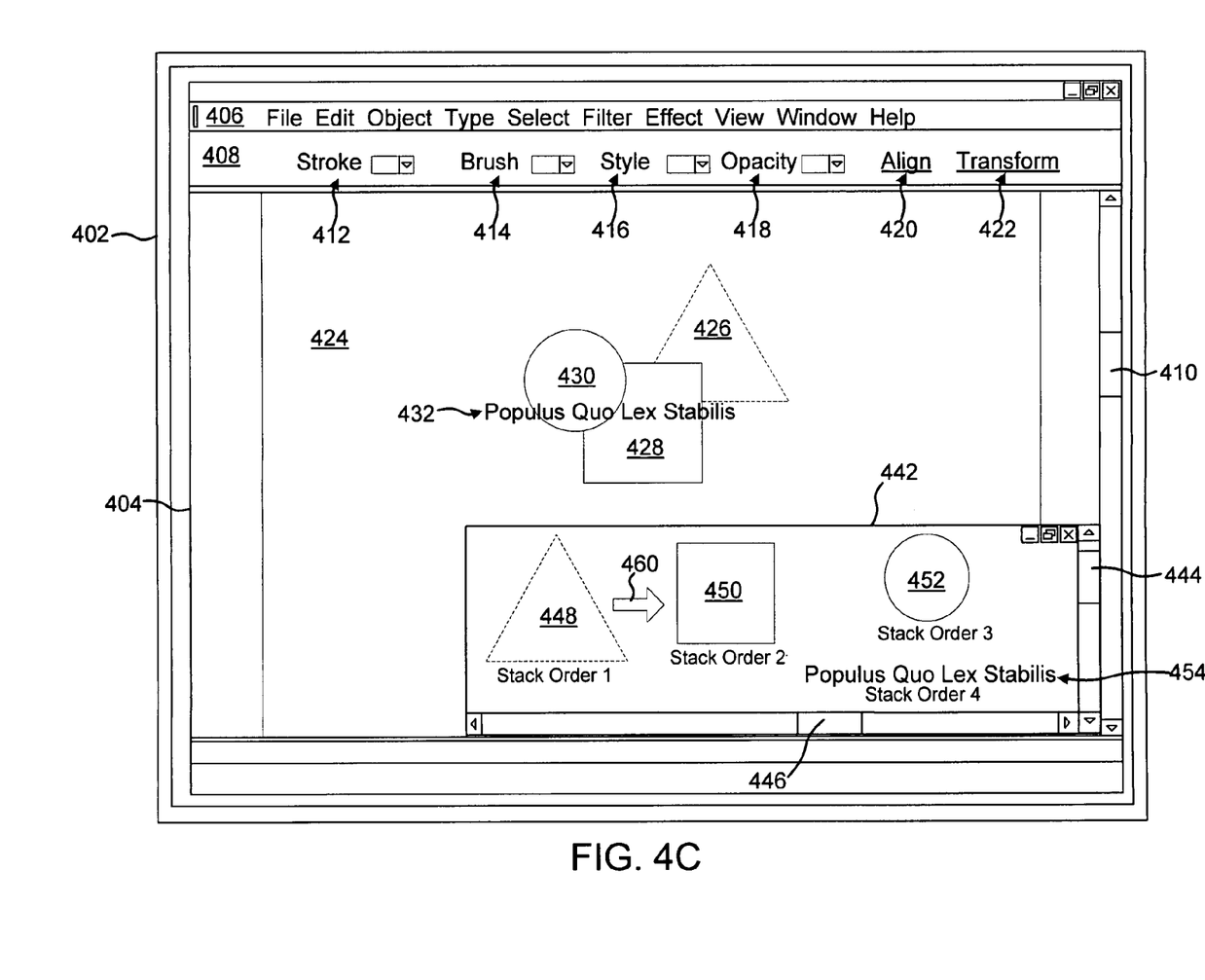
FIG. 4C illustrates a further exemplary application interface for stack object order traversal and manipulation.

FIG. 4C illustrates a further exemplary application interface for stack object order traversal and manipulation. Here, interface 402 is shown with document panel 404, menu panel 406, operation panel 408, scroll bar 410, operations 412-422, document 424, stack objects 426-432, object preview panel 442, preview panel scroll bars 444-446, objects 448-454, and arrow 460. When object preview panel 442 is invoked (i.e., a user initiates presentation of object preview panel 442 using various techniques, examples of which are described above in connection with FIG. 4B), objects 448-454 may be presented. In some examples, objects 448-454 may be generated using data from object data files associated with stack objects 426-432 and, when updates are made to any of objects 448-454, corresponding updates may be applied to stack objects 426-432. In other words, operations performed on objects 448-454 in object preview panel 442 may be reflected, simultaneously or substantially simultaneously, in document 424 and stack objects 426-432. Object preview panel 442 is configured to allow a user to select and perform an operation on a stack object (e.g., stack objects 426-432) without having to manipulate, traverse, or otherwise change the actual document (i.e., stack objects 426-432). Further, an order associated with stack objects 426-432 may be traversed or otherwise manipulated using information presented in object preview panel 442.

Here, the stack order number of each of stack objects 426-432 is shown underneath one of the corresponding objects 448-454. For example, the stack order number of stack object 432 (i.e., the text "Populus Quo Lex Stabilis") is shown as "Stack Order 4" underneath object 454 in object preview panel 442. As an example of an operation, one or more of stack objects 426-432 may be swapped in stack order. In some examples, when an object (i.e., objects 448-454) is selected and moved over another object in object preview panel 442, the moved object displaces the underlying object and assumes the displaced object's stack order. When selected, object 448 and stack object 426 may be visually indicated as being selected. As an example, object 448 and stack object 426 may be highlighted using a different-colored pixel border, broken lined outline, solid lined outline, or other technique. As shown here, object 448 and stack object 426 are visually indicated using a broken line border to indicate that object 448, and consequently, stack object 426, was selected in object preview panel 442. For example, object 448 may be moved (e.g., by "clicking-and-dragging" using a mouse or other user input device) in the direction of arrow 460 over object 450. Once moved, object 448 assumes object 450's stack order (i.e., stack order 2). Likewise, object 450 assumes object 448's stack order (i.e., stack order 1). Further, the operation, once performed, is reflected in document 424, as described below in greater detail. In other examples, interface 402 and the above-described elements may be varied in layout, design, function, appearance, or other aspects and are not limited to those shown and described.

Figure 4D:
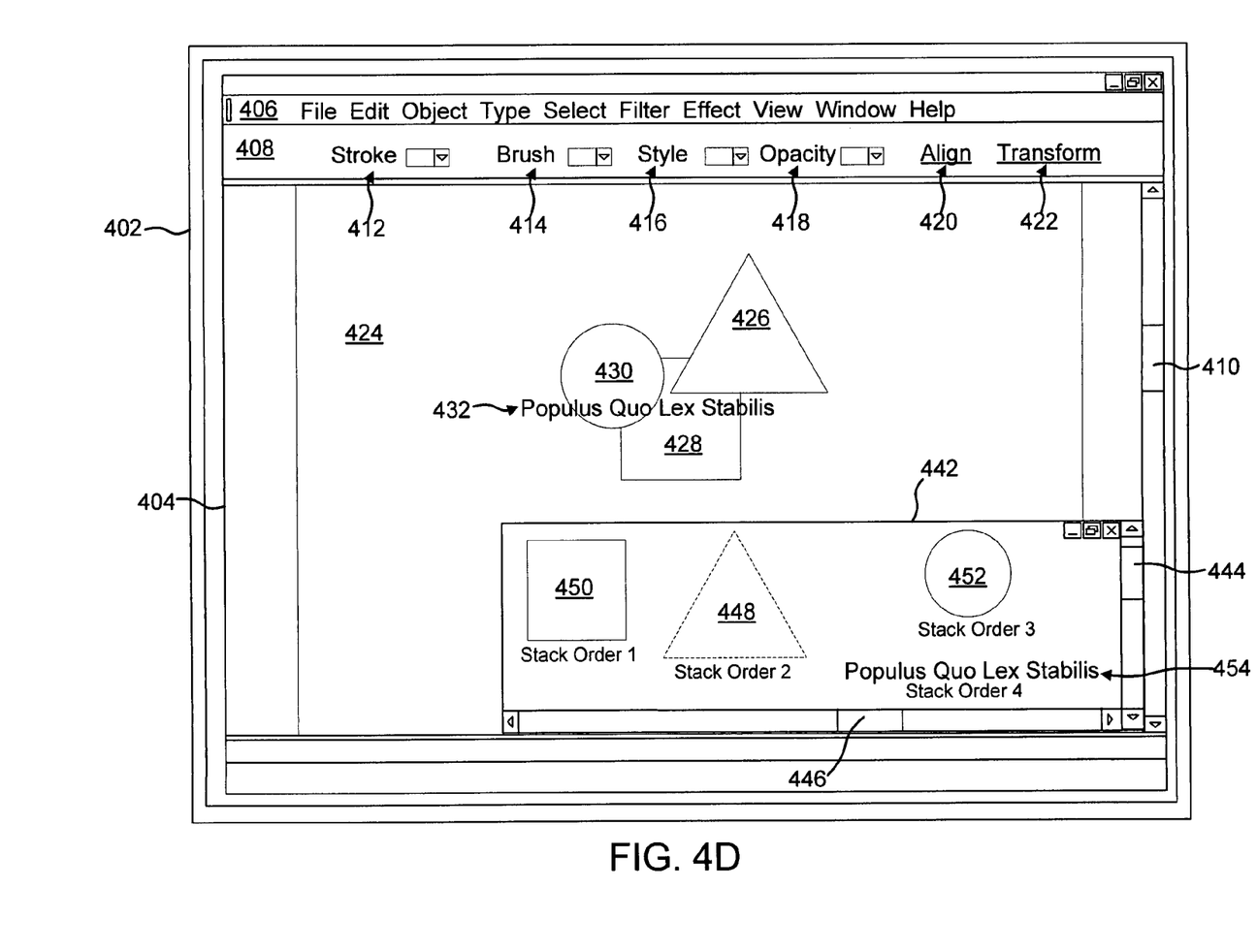
FIG. 4D illustrates yet another exemplary application interface for stack object order traversal and manipulation.

FIG. 4D illustrates yet another exemplary application interface for stack object order traversal and manipulation. Here, interface 402 is shown with document panel 404, menu panel 406, operation panel 408, scroll bar 410, operations 412-422, document 424, stack objects 426-432, object preview panel 442, preview panel scroll bars 444-446, and objects 448-454. As a further example of the move operation described above in connection with FIG. 4C, after moving object 448, object 450 assumes stack order 2 and the former assumes stack order 1. Further, the corresponding stack objects (i.e., stack object 426 and stack object 428) also swap places in terms of stack order, which is visually reflected in document 424. In other examples, different types of operations may be performed.

In some examples, stack objects may be swapped in order. For example, using the techniques described herein, stack object 432 may be moved from stack order 4 to stack order 1 by selecting stack object 454 in object preview panel 442 and graphically moving it over object 450. In other examples, different types of operations may be performed on one or more of stack objects 426-432. For example, a geometric transformation may be performed on one or more of stack objects 426-432 by selecting one of objects 448-454 in preview panel 454. After selecting one or more of objects 448-454 in object preview panel 442, operation 422 may be selected from operation panel 408, thus invoking another drop down, pull down, call out, or other type of menu (not shown). In some examples, attributes such as height, length, side length, width, angular displacement, or others may be modified. After modifying desired attributes using operation 422, the indicated transformation (not shown) may be previewed in object preview panel 442 and shown in document 424 in document panel 404. In other examples, different types of operations (e.g., operations 412-420 and others) may be performed and are not limited to those shown and described. Further, interface 402 and the above-described elements may be varied in layout, design, function, appearance, or other aspects and are not limited to those shown and described.

Figure 5A:
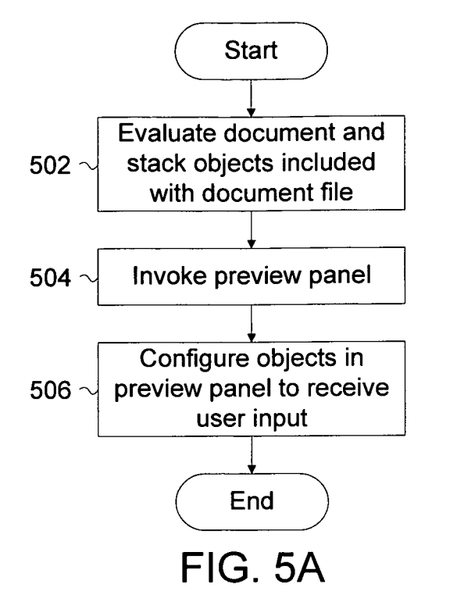
FIG. 5A illustrates an exemplary process for stack object order traversal and manipulation.

FIG. 5A illustrates an exemplary process for stack object order traversal and manipulation. Here, an evaluation is performed on a document (e.g., document 424 (FIGS. 4A-4D) and any stack objects (e.g., stack objects 426-432 (FIGS. 4A-4D)) included within it (502). As an example, a document may be generated using a document file containing data used to render the document and its content (e.g., stack objects). Likewise, stack objects may have associated stack object data files that are used to generate, render, and display stack objects within a document. In some examples, stack object data files may also be used to generate, render, and display (i.e., present) objects in object preview panel 442. After evaluating the document and any included stack objects, an object preview panel (e.g., object preview panel 442 (FIGS. 4C-4D) are invoked (504). Once invoked, objects are presented in an object preview panel and configured to receive user input (e.g., input indicating a desired operation (e.g., move, swap, transformation, or others)) (506). In other examples, the above-described process may be varied in steps, order, design, and implementation without limitation to the examples provided.

Figure 5B:
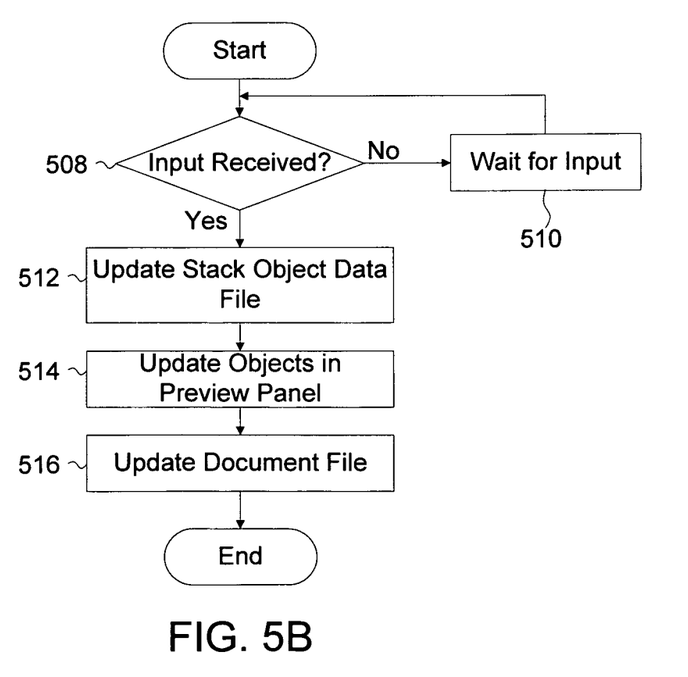
FIG. 5B illustrates a further exemplary process for stack object order traversal and manipulation.

FIG. 5B illustrates a further exemplary process for stack object order traversal and manipulation. Here, a further process for evaluating a document and any included stack objects is described. In some examples, a determination is made as to whether an input (e.g., a marquee or other type of selection using, for example, a mouse or other user input device) indicating selection of one or more stack objects has been received (508). If no input has been received, then application 200 (FIG. 2) or 300 (FIG. 3) waits to receive an input (510). If an input is received, then any stack objects are updated (i.e., added, deleted, or otherwise modified) (512). In some examples, stack objects are updated by making any indicated changes to the stack object data files associated with the indicated stack objects. After, or substantially simultaneously with updating the stack object data files, objects presented in an object preview panel are also updated (514). Still further, updates are also made to the evaluated document (516). In some examples, updates may be performed by updating or modifying the document file associated with the evaluated document. Likewise, stack objects may be updated by modifying any associated stack object data files. Further, updates or notifications to the stack object data files, document file, or objects presented in an object preview panel may also be made sequentially, simultaneously, or substantially simultaneously. In other examples, the above-described process may be varied in steps, order, design, and implementation without limitation to the examples provided.

Figure 6A:
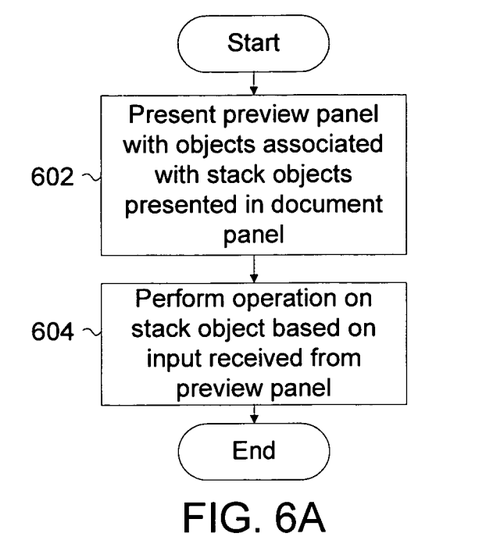
FIG. 6A illustrates an alternative exemplary process for stack object order traversal and manipulation.

FIG. 6A illustrates an alternative exemplary process for stack object order traversal and manipulation. In some examples, an object preview panel (e.g., object preview panel 442 (FIGS. 4C-4D)) may be presented with objects (e.g., objects 448-454 (FIGS. 4C-4D)) associated with stack objects (e.g., stack objects 426-432 (FIGS. 4A-4D)) presented in a document panel (e.g., document panel 404 (FIGS. 4A-4D)) (602). Once presented, stack objects may be selected to perform operations based on receiving an input (e.g., selection of an object presented in an object preview panel) (604). In other examples, the above-described process may be varied in steps, order, design, and implementation without limitation to the examples provided.

Figure 6B:
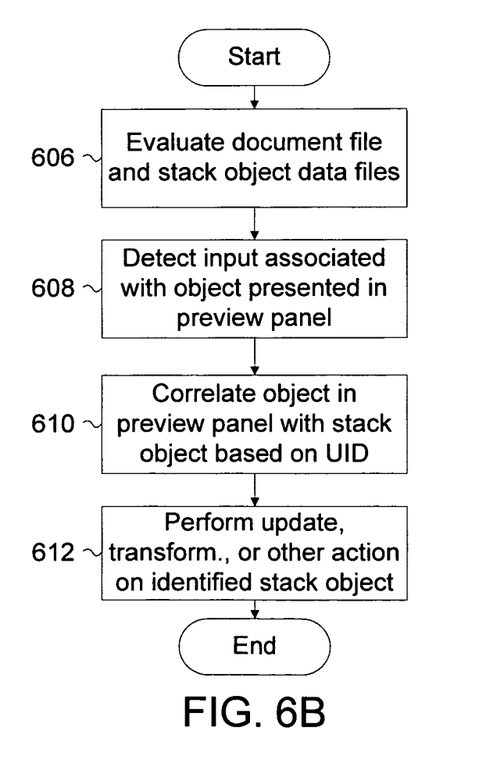
FIG. 6B illustrates another alternative exemplary process for stack object order traversal and manipulation.

FIG. 6B illustrates another alternative exemplary process for stack object order traversal and manipulation. As a subprocess of performing operations on stack objects by selecting objects within an object preview panel (e.g., 604 (FIG. 6A)), a document file and stack object data files associated with a document and includes stack objects, respectively, may be evaluated (606). Subsequently, an input may be detected in association with an object presented in an object preview panel (608). An object selected in an object preview panel is correlated to a stack object in a document based on a stack object unique identifier (i.e., "UID") (610). In some examples, UIDs may be identified or found in "stack object wrappers" or other data included with stack object data files. For example, a stack object UID may be presented in, for example, structured, object-oriented programming languages such as C or C++ as:

```
typedef struct ObjectWrapper {
UID ObjectUID;
Long ObjectPos;
} Stack Object
```

Other types of data structures, programming languages, protocols, and the like may be used to generate and include stack object wrappers with stack object data files and are not limited to any specific example. After correlating an object selected in an object preview panel with a stack object associated with a document and presented in a document panel, updates, transformations, usages, notifications, or other indicated (i.e., as indicated by the detected input), actions are performed on the indicated stack object and its associated stack object data file. Further, updates to a stack object data file may be used to generate, render, and present updates to objects presented in an object preview panel (612). In other examples, the above-described process may be varied in steps, order, design, and implementation without limitation to the examples provided.

Figure 7:
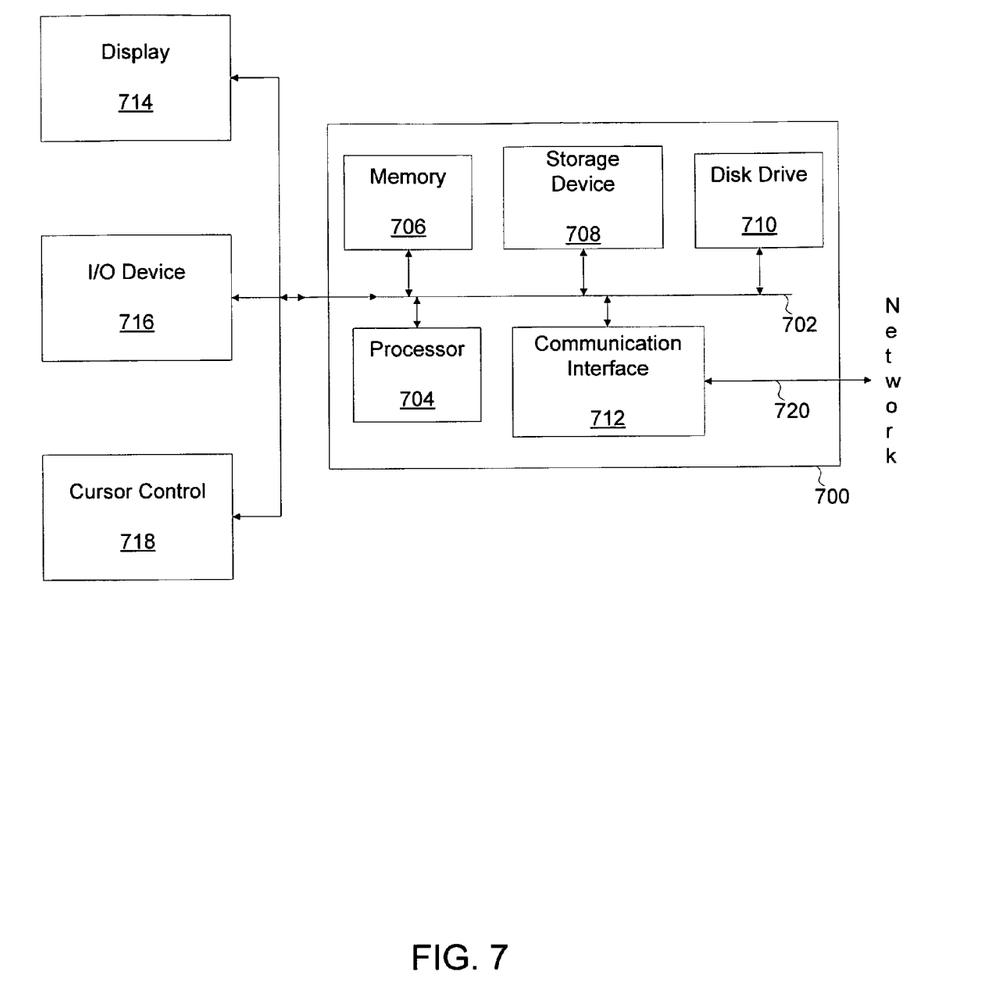
FIG. 7 illustrates an exemplary computer system suitable for stack object order traversal and manipulation.

FIG. 7 illustrates an exemplary computer system suitable for stack object order traversal and manipulation. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
receiving, via a document panel, a selection of a stack of objects of a document presented in the document panel;
in response to the received selection, invoking an object preview panel comprising a plurality of objects, wherein each of the plurality of objects in the object preview panel is an editable representation of a corresponding object of the selected stack of objects of the document presented in the document panel, wherein the stack of objects in the document panel are displayed in the document according to a stack order, and wherein the plurality of objects in the object preview panel are displayed in an unstacked display and non-overlapping fashion, and the object preview panel only shows the unstacked non-overlapping objects and a corresponding stack order for each of those objects; and receiving input, via the object preview panel, for one of the plurality of objects in the object preview panel indicating an edit operation to change an appearance of the corresponding object of the stack of objects of the document, wherein an effect of the operation is presented both within the preview panel and within the document panel.

2. The method of claim 1, wherein the different objects of the stack of objects of the document presented in the document panel are at least partially overlapping.

3. The method of claim 1, wherein the object preview panel is presented in an interface associated with an application configured to edit the document.

4. The method of claim 1, further comprising evaluating the document to identify an object file associated with each of the selected stack objects, wherein the object files are used to create the editable representations of the objects within the object preview panel.

5. The method of claim 1, further comprising evaluating the document to identify a document file associated with the document.

6. The method of claim 1, further comprising receiving input for another one of the plurality of objects in the object preview panel indicating a transformation operation associated with a corresponding another different object of the stack of objects in the document panel, wherein the transformation operation transforms the corresponding another different object, wherein the transformation operation is configured to update a data structure associated with the corresponding another different object such that an effect of the transformation operation is presented both within the object preview panel and within the document panel.

7. The method of claim 6, wherein the transformation operation is a geometric transformation.

8. The method of claim 1, further comprising receiving input for another one of the plurality of objects in the object preview panel indicating a movement operation associated with a corresponding another different object of the stack of objects in the document panel, wherein the movement operation moves the corresponding another different object, wherein the movement operation is configured to update a data structure associated with the corresponding another different object such than an effect of the movement operation is presented both within the object preview panel and within the document panel.

9. The method of claim 8, wherein the movement operation comprises swapping the corresponding another different object with at least one of the different objects of the stack of objects of the document by manipulating at least one of the plurality of objects in the object preview panel, wherein said swapping includes changing the stack order.

10. The method of claim 1, further comprising presenting the object preview panel using a configuration setting.

11. The method of claim 10, wherein the configuration setting is user-specified.

12. The method of claim 10, wherein the configuration setting is system-specified.

13. The method of claim 10, wherein each of the plurality of objects is presented in the object preview panel according to a hierarchy associated with the stack of objects in the document panel.

14. The method of claim 13, wherein the hierarchy comprises a top-to-bottom orientation.

15. The method of claim 13 wherein the hierarchy comprises a bottom-to-top orientation.

16. The method of claim 1, wherein at least one unselected object of the document panel is not shown in the preview panel.

17. A system, comprising:
a memory storing data associated with a document; and
a processor configured to:
receive, via a document panel, a selection of a stack of objects of a document presented in the document panel,
invoke an object preview panel comprising a plurality of objects, wherein each of the plurality of objects in the object preview panel is an editable representation of a corresponding object of the selected stack of objects of the document presented in the document panel, wherein the stack of objects in the document panel are displayed in the document according to a stack order, and wherein the plurality of objects in the object preview panel are displayed in an unstacked display and non-overlapping fashion; and the object preview panel only shows the unstacked non-overlapping objects and a corresponding stack order for each of those objects; and
receive input, via the object preview panel, for one of the plurality of objects in the object preview panel indicating an operation associated with the corresponding object of the stack of objects of the document, wherein the operation edits an attribute to change an appearance of the corresponding object, wherein an effect of the operation is presented both within the object preview panel and within the document panel.

18. The system of claim 17, wherein at least one unselected object of the document panel is not shown in the preview panel.

19. A method, comprising:
receiving, via a document panel, a selection of a plurality of stack objects of a document presented in a document panel;
presenting an object preview panel comprising a plurality of objects, wherein each of the plurality of objects in the object preview panel is an editable visual reproduction of a corresponding one of the selected plurality of stack objects of the document presented in the document panel, wherein the stack objects of the document are displayed in the document panel according to a stack order, and wherein the plurality of objects in the object preview panel are displayed in an unstacked display and non-overlapping fashion, and the object preview panel only shows the unstacked non-overlapping objects and a corresponding stack order for each of those objects; and
performing, via the object preview panel, an edit operation in response to user input, wherein the operation includes editing an attribute of one of the plurality of stack objects of the document to change an appearance of the one of the plurality of stack objects of the document, wherein an effect of the panel.

20. The method of claim 19, wherein one of the plurality of stack objects of the document presented in the document panel comprises text.

21. The method of claim 19, wherein one of the plurality of stack objects of the document presented in the document panel comprises a geometric shape.

22. The method of claim 19, wherein one of the plurality of stack objects of the document presented in the document panel comprises an image.

23. The method of claim 19, wherein at least one unselected object of the document panel is not shown in the preview panel.

24. A computer program product embodied in a non-transitory computer readable medium and comprising computer instructions for:
- receiving, via a document panel, a selection of a stack of objects of a document presented in the document panel;
- invoking an object preview panel comprising a plurality of objects, wherein each of the plurality of objects in the object preview panel is an editable representation of a corresponding object of the selected stack of objects of the document presented in the document panel, wherein the stack of objects in the document panel are displayed in the document according to a stack order, and wherein the plurality of objects in the object preview panel are displayed together in an unstacked display and non-overlapping fashion, and the object preview panel only shows the unstacked non-overlapping objects and a corresponding stack order for each of those objects; and
- receiving input, via the object preview panel, for one of the plurality of objects in the object preview panel indicating an edit operation associated with the corresponding object of the stack of objects of the document, wherein the operation edits an attribute to change an appearance of the corresponding object, wherein an effect of the operation is presented both within the object preview panel and within the document panel.

25. The computer program product of claim 24, wherein at least one unselected object of the document panel is not shown in the preview panel.

26. A computer program product embodied in a non-transitory computer readable medium and comprising computer instructions for:
- receiving, via a document panel, a selection of a plurality of stack objects of a document presented in a document panel;
- presenting an object preview panel comprising a plurality of objects, wherein each of the plurality of objects in the object preview panel is an editable representation of a corresponding one of the selected plurality of stack objects of the document presented in the document panel, wherein the stack objects in the document panel are displayed in the document panel according to a stack order, and wherein the plurality of objects in the object preview panel are displayed in an unstacked display and non-overlapping fashion, and the object preview panel only shows the unstacked non-overlapping objects and corresponding stack order for each of those objects; and
- performing, via the object preview panel, an edit operation, wherein the operation includes editing an attribute of one of the plurality of stack objects of the document to change an appearance of the one of the plurality of stack objects, wherein an effect of the operation is presented in both the object preview panel and the document panel.

* * * * *